United States Patent [19]

Taylor et al.

[11] 4,093,772

[45] June 6, 1978

[54] PRESSURE-ACTIVATED AND NON-TACKY LIFT-OFF ELEMENT AND PROCESS THEREFOR

[75] Inventors: Jerry H. Taylor, Webster; Gabriel T. Turula, Rochester, both of N.Y.

[73] Assignee: Burroughs Corporation, Detroit, Mich.

[21] Appl. No.: 764,204

[22] Filed: Jan. 31, 1977

[51] Int. Cl.$^2$ ......................... B32B 27/08; B32B 27/10

[52] U.S. Cl. ..................................... 428/339; 428/261; 428/346; 428/474; 428/483; 428/484; 428/486; 428/487; 428/516; 428/520; 428/355; 427/207 B; 427/146; 400/195; 400/695

[58] Field of Search ............... 428/346, 261, 516, 474, 428/483, 484, 520, 339, 355; 197/172, 181

[56] References Cited

U.S. PATENT DOCUMENTS

| | | | |
|---|---|---|---|
| 3,664,869 | 5/1972 | Sala et al. | 428/518 X |
| 3,922,438 | 11/1975 | Brown et al. | 428/411 |
| 3,924,728 | 12/1975 | Brown et al. | 428/261 X |
| 3,993,630 | 11/1976 | Darmory et al. | 428/474 X |

FOREIGN PATENT DOCUMENTS

| | | |
|---|---|---|
| 2,318,188 | 10/1974 | Germany. |

*Primary Examiner*—P. C. Ives

*Attorney, Agent, or Firm*—Kevin R. Peterson; Edward J. Feeney, Jr.; Lynn L. Augspurger

[57] ABSTRACT

Disclosed is a non-tacky lift-off tape for letters or characters printed or typed in error comprised of a resin and amine wax coating applied to a film substrate.

15 Claims, 5 Drawing Figures

PRESSURE-ACTIVATED AND NON-TACKY LIFT-OFF ELEMENT AND PROCESS THEREFOR

Figure 1:
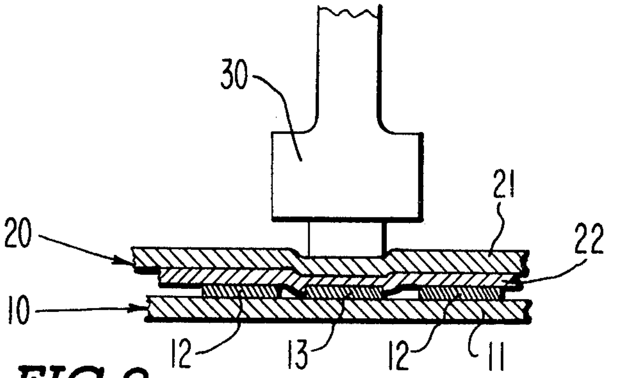

Several methods are known for the correction of typed errors. The most common method, other than using rubber erasers, is the masking method whereby the erroneous image is overstruck using a white transfer composition which transfers to the surface of the erroneous image and blends with the white color of the paper to mask the erroneous image from view. Thereafter the correct image is typed over the masked image. The masking method is unsatisfactory in cases where the copy paper is other than white and also in cases where the copy paper or sheet is highly translucent or is transparent. Also in cases where the copy sheet is reproduced by methods such as infrared duplication, the masked erroneous image may be duplicated on the copy together with the correct image as an illegible combined image.

Another method proposed years ago in Baldwin U.S. Pat. No. 1,183,424 and more recently in Korb et al U.S. Pat. No. 3,724,633 (IBM) relates to the use of an adhesive ribbon to pick erroneous typed images from a copy sheet. The method is in current commercial use and is similar to the masking method to the extent that the erroneous image is overstruck using the appropriate type key. However, instead of interposing a ribbon carrying a transferable masking coating, one interposes a ribbon carrying a sticky adhesive coating, similar to Scotch tape. The sticky ribbon is retained spaced from the copy sheet to be corrected except in impressed areas which adhere to the erroneous image and lift the erroneous image from the copy sheet when typing pressure is released. Thereafter the correct image is typed in place of the removed image. Preferably this method is used in association with imaging compositions which are dry and substantially free of oils and dissolved dyes which can migrate into the copy paper and stain the paper fibers.

While such adhesive correction ribbons are in current commercial use, they do now present important problems. Such adhesive ribbons must be mounted on special spools and tensioned and moved using special mechanisms which must be built into the typewriter in addition to the spools and mechanisms present in every typewriter for the support and movement of the imaging ribbon. Thus a special typewriter is required. Also, it is not possible to use such adhesive coatings on conventional split correction ribbons in place of the masking coating such as in the ribbons of U.S. Pat. No. 3,664,869, because it is not possible to evenly wind a ribbon on a spool if one-half the width of the ribbon is sticky and the other half is not. Also, the sticky half of the ribbon will tend to stick to the conventional ribbon guides, the uneven amount of tension required to pull the sticky and non-sticky halves of the ribbon from the spool will cause breakage of the ribbon, and unless the ribbon is rewound perfectly even on the take-up spool, the sticky half of the ribbon will overlap with portions of the imaging half of the ribbon and will pull the latter from the foundation when the ribbon travel is reversed for reuse.

Finally, it is not possible to use such sticky adhesive coatings on correction tabs or sheets of the type used for masking compositions. If the sticky coating is placed against an imaged copy sheet as done with masking tabs and sheets, the sticky coating will adhere to the copy sheet and will pick off all of the images which it contacts rather than selectively picking off the erroneous image.

The principal object of U.S. Pat. No. 3,924,728 was to provide a correction element carrying a latent adhesive coating which is not sticky to the touch and will not adhere to itself but which is capable of being rendered sticky and adhesive by the application of imaging pressure thereto, such as typing pressure.

It was designed to provide cooperative elements adapted for cooperate use, one element comprising a pressure-sensitive transfer element carrying a transfer composition and the other element comprising a correction element having a latent adhesive composition adapted to remove images formed from such transfer composition under the effects of typing pressure.

SUMMARY OF THE INVENTION

It is the principal object of our invention to provide a tack free-lift-off tape which because of the inherent nature of the coating eliminates the tape attaching itself or sticking to the ribbon, cardholder or paper or to itself when folded over.

Accordingly we have provided the tape base layer with a non-tacky coating composed of an amide type wax, resins and plasticizers in a suitable solvent combination.

These and other objects and advantages of the present invention will be apparent to those skilled in the art in the light of the present disclosure including the drawings, in which:

FIG. 1 is a diagrammatic cross-section, to an enlarged scale, of an imaged copy sheet and a correction element superposed under the effect of typing pressure.

Figure 2:
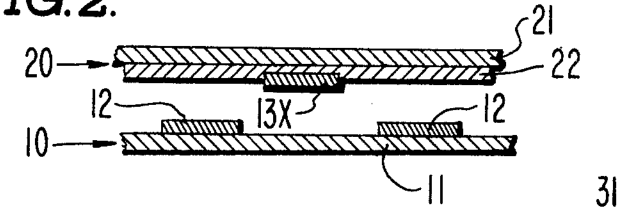
Figure 3:
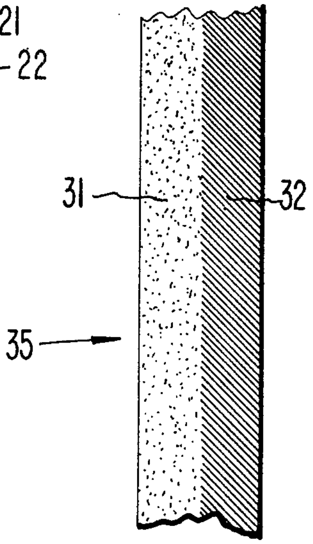
Figure 4:
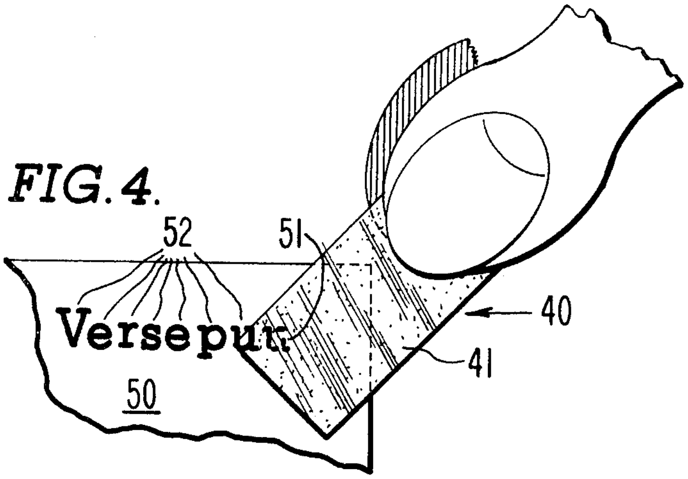
Figure 5:
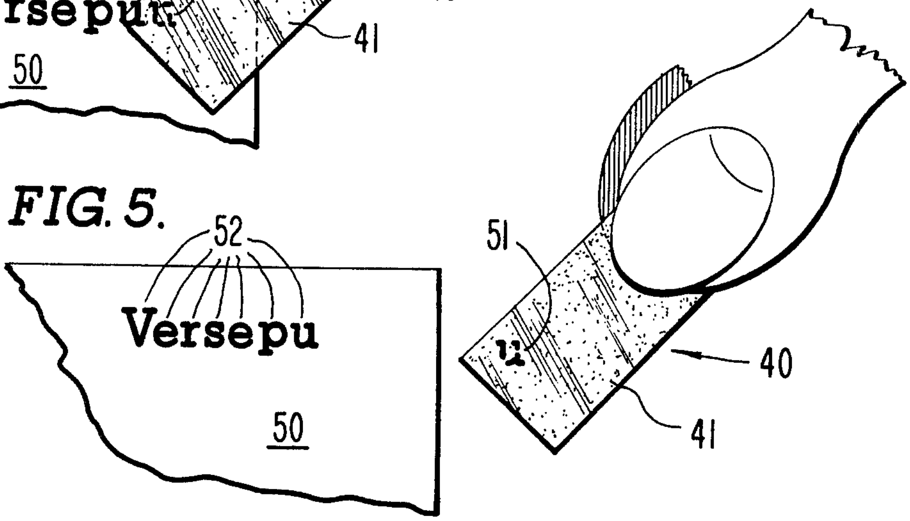

FIG. 2 corresponds to FIG. 1 but shows the sheets separated after the release of the typing pressure, the impressed center images remaining adhered to the correction element after having been lifted off the copy sheet, FIG. 3 is a plan view of a section of a split imaging-correction ribbon produced according to one embodiment of this invention, FIG. 4 is a diagrammatic plan view of a word on a copy sheet containing an erroneous letter *u*, and a correction tab, produced according to another embodiment of this invention, held in position over the erroneous image preparatory to the application of typing pressure, and FIG. 5 corresponds to FIG. 4, but shows the elements separated after the application of typing pressure, the erroneous image m being removed from the copy sheet and being adhered to the underside of the correction tab.

The drawings illustrate the use of the present sheet materials as image correction materials in different forms.

Referring to the drawing, FIG. 1 illustrates an imaged copy sheet 10 and a pressure-correction sheet 20 superposed under the pressure of a type bar 30. The copy sheet 10 consists of a flexible paper or plastic film sheet 11 carrying solid images 12 and 13 which have been typed thereon using a film or paper-base typewriter ribbon coated with a solvent-applied solid dry transfer composition. The correction sheet 20 consists of a flexible paper or plastic film sheet 21 carrying a pressure layer 22.

The type bar 30 carries an image type face corresponding to the erroneous center image 13 to be removed from the copy sheet 10. Under activation of the appropriate type key, bar 30 strikes the rear surface of correction sheet 20 and produces an imagewise pressure contact between sheets 20 and 10, said contact being limited to the area of center image 13 and the corresponding area of the pressure layer 22. The base stratum is in pressure contact with the center image 13. In the non-impressed areas, the other images 12 are in normal surface contact with the non-tacky surface stratum and do not adhere thereto.

When impact pressure is relaxed by withdrawal of the type bar 30 and the sheets 10 and 20 are separated the center image 13 remains bonded to the correction layer 22 on the correction sheet 20 and is cleanly lifted off the copy sheet 10, as illustrated by image 13X in FIG. 2 of the drawing. The copy sheet 10 can now be reimaged in the appropriate area to substitute a correct image for the erroneous image 13 which has been removed.

FIG. 3 illustrates a split imaging-correction ribbon 35 having lengthwise ripes of pressure correction composition 31 and complementary pressure-transferable imaging composition 32 which is specially formulated so as to be cleanly removable from a copy sheet by means of said correction composition. The ribbon 35 has a flexible foundation, preferably a plastic film and the stripes 31 and 32 preferably are applied to the foundation as solutions using appropriate volatile solvents and appropriate printing rollers. On drying by evaporation of the volatile solvent, the correction stripe 31 forms a non-tacky coating. Alternatively, one or both of the stripes 31 and 32 may be produced on a separate foundation and cut and adhered on a common foundation to produce the structure illustrated by FIG. 3.

FIGS. 4 and 5 illustrate the use of a correction sheet 40 in tab form to remove an incorrect image 51 from a copy sheet 50 carrying correct images 52. The tab 40 comprises a clear, flexible plastic film foundation 41 and the correction layer on the underside thereof is non-tacky whereby the tab 40 is sufficiently translucent on transparent that the underlying image 51 can be clearly viewed therethrough to insure proper positioning of the tab 40 against the image 51.

When the u key is activated on the typewriter, the tab 40 is pressed imagewise against the image 51 and adheres to and lifts the image 51 from the copy sheet 50 when the tab 40 is removed from the copy sheet 50. The other correct images 52 remain on the copy sheet 50.

As mentioned supra, the pressure correction materials of the present invention comprise a flexible foundation such as paper or plastic film carrying a pressure-activated adhesive correction layer. The foundation preferably is one which does not absorb the correction layer to any substantial degree. Thus less porous papers and treated papers such as glassine paper are preferred while normally porous papers having a resinous barrier layer supporting the correction layer are also suitable. Clear plastic films are preferred for some applications because of their strength, pressure-deformability and transparency and impervious nature. Resinous undercoatings may be used to bond the correction layer to the film foundation where necessary. Preferred films are polyethylene terephthalate polyester, polyethylene, polypropylene, cellulose acetate, nylon, and the like depending upon whether sheets, ribbons or tabs are being produced. Generally the paper foundations are preferred for correction material sold in continuous tape form in a conventional correction tape dispenser provided with means for facilitating the tearing of desired lengths from the continuous tape since paper tears more easily than plastic films. However, plastic film foundations may also be used for continuous tapes provided that a suitable cutter is used on the dispenser such as a metallic tearing means. On the other hand, plastic films are generally preferred as foundations for correction material sold and used without tearing, i.e. as ribbons, individual full sheets or tab sheets, or the like, where strength and durability are important.

It will be recognized that the general description given above is illustrative of the prior art articles, be they tacky in the layer 22 or non-tacky by the means employed by U.S. Pat. No. 3,924,728 issued Dec. 9, 1975.

Both types of prior art articles, while used for similar purposes do not achieve the cost-effectiveness of our present invention. Tacky types are unsatisfactory because of their feel and stickiness to not only the paper but to other articles as well.

The prior non-tacky system is more expensive and can be made sticky when the surface material is broken at the barrier.

We have eliminated the incompatible non-tacky component and the surface barrier to a latent adhesive layer of this prior art.

Instead we have provided an effective non-tacky solvent system in which all of the components are compatible and soluble. Each component is soluble separately in the solvents and the final coating 22 is homogenous and uniform in its entire thickness.

In our preferred embodiment of our invention, the layer 22 is composed of and comprises an amide type wax, resins and plasticizers, preferable in a 90-10 toluene-isopropanol solvent combination. This combination provides the necessary physical contact, conformity and adherence to the typed error so that removal of the erroneous typed character is possible.

Specifically, the preferred combination of components that performs the best is given below. The role or purpose of each component and in combination is described following the formulation breakdown.

| Component | % By Weight | % As Applied* |
|---|---|---|
| | Dry | |
| Glyconol Amide Wax | 50 | 20.0 |
| Emerez 1533 Polyamide Resin | 26 | 10.4 |
| K-484 Penta Resin | 14 | 5.6 |
| DIDP (Di Isodecyl Phthalate) | 5 | 2.0 |
| DCHP (Dicyclohexyl Phthalate) | 5 | 2.0 |
| Toluene | — | 54.0 |
| Isopropanol | — | 6.0 |
| | 100 | 100.0 |

*The ranges of this example may be plus or minus 30% by weight.
Suppliers
Glyconol Amide Wax - Glyco Chemicals, Inc.
Emerez 1533 Polyamide Resin - Emery Industries, Inc.
K-484 Penta Resin - Lawter Chemicals, Inc.
DIDP - Exxon Chemical Co. U.S.A.
DCHP - Monsanto Co.

All the above components are soluble separately or in combination in the 90:10 - Toluene: Isopropanol solvent mixture. The final coating is clear and free of any insoluble or inert materials. This results in a final coated product on a polyester film base which is homogenous and uniform through its thickness. The solvent is less than 80% by weight of the coating 23 when applied to the substrate 21.

The purpose of the Glyconol Amide wax is to impart dry cohesive tack. Glyconol is soft and tacky and this property enables the final coating to be embossed with typing pressure and this results in good contact and conformity to the typed error.

Glyconol is a synthetic amide wax product which is relatively non-crystalline. It is a soft tacky solid with a melting point of about 100 to 108° C., flash point of about 215° C., s.g. of 0.85 and penetrometer hardness of 1.73 cm. about 200 g./min. It is marketed by Glyco Chemicals, Inc.

K-484 resin marketed by Lawter Chemicals, Inc. is used with added DIDP and DCHP plasticizers to obtain good adhesion of the coating to the film substrate. K-484 is an extremely hard penta resin which is a pentaerythritol ester of dimerized resin. It has a s.g. of 1.08, softening point of 185° C. and acid number of 19.

Emerez 1533 polyamide resin serves as a binder for all the aforementioned components and also imparts firmness and non-tacky feel to the hand. It is marketed by Emery Industries, Inc. and is a reaction product of ethylene diamine, dimer acids, and monomeric organic acids containing a diphenolic acid chain terminator. This diphenolic based polyamide resin has a softening point of about 98° to 102° C., viscosity at 160° C. of 26 to 34 poises, an amine value of 5.2 milligrams KOH per gram, an acid value of 2.5 milligrams KOH per gram, and a density of 8.3 pounds per gallon.

In order to obtain good adhesion of the coating to the polyester film substrate the K-484 penta resin with added DIDP and DCHP plasticizers are used. K-484 is an extremely hard resin and with these plasticizers is used as an adhesion promoter of the final coating to the substrate.

The Emerez 1533 polyamide resin serves as a binder for all the aforementioned ingredients and also gives the final coating a degree of firmness and non-tacky feel to the hand.

Since the typed correctable ribbon error of the ribbons used by the major manufacturers today contains a polyamide resin binder, it is natural that a lift-off coating high in this resin would provide good compatibility and adhesion for removal and this we have found to be the case. In order to enhance the performance of this polyamide resin, in this respect, we found that Glyconol provides additional lift-off capability by nature of its dry tack and ability to conform and make good contact with the typed error.

Accordingly the amide wax when placed in pressure contact with the ribbon ink having a polyamide resin binder lifts off the typed error with ease.

Variations and modifications may be made within the scope of the claims and portions of the improvements may be used without others.

What we claim is:

1. A pressure-activated element comprising:
- a flexible, pressure-deformable flexible film substrate foundation supporting a removal adhesive layer for removing typed or printed errors or the like;
- said removal adhesive layer consisting essentially of a resin and an amide wax combined as a homogeneous coating such that said adhesive layer is substantially homogeneous and of uniform thickness providing a continuous stratum which is substantially non-tacky to the touch.

2. An element according to claim 1 wherein the wax is a synthetic amide wax product which is relatively non-crystalline and has a melting point of substantially 100° to 108° C.

3. An element according to claim 1 wherein the substrate is a film of one of the following groups of films, nylon, polyethylene, polypropylene, or polyester.

4. An element according to claim 1 wherein the solvent is evaporated after the coating is applied to said flexible film substrate.

5. A pressure-activated element according to claim 1 in which said resin is a polyamide resin.

6. A pressure-activated element according to claim 5 in which the adhesive layer is applied to said flexible film substrate with a solvent.

7. An element according to claim 5 wherein the synthetic non-crystalline amide wax comprises 35 to 65% of the non-tacky coating on the substrate after the solvent has been evaporated.

8. A tape element according to claim 5 wherein the synthetic non-crystalline amide wax comprises 45 to 55% of the non-tacky coating on the substrate after the solvent has been evaporated.

9. A non-tacky lift-off element for use as a tape, ribbon, sheet or tab for removing printed characters comprising:
- a flexible film substrate;
- a non-tacky coating on the substrate consisting essentially of:
- a synthetic non-crystalline amide wax;
- a polyamide resin and plasticizers therefor, and
- a solvent; and wherein the solvent is less than 80% of the coating by weight upon application of the coating to the substrate.

10. An element according to claim 9 wherein the wax is a synthetic amide wax product which is relatively non-crystalline and has a melting point of substantially 100° to 108° C.

11. An element according to claim 9 wherein the substrate is a film of one of the following groups of films, nylon, polyethylene, polypropylene, or polyester.

12. An element according to claim 9 wherein the solvent is evaporated after the coating is applied to said flexible film substrate.

13. An element according to claim 10 wherein the synthetic non-crystalline amide wax comprises 35 to 65% of the non-tacky coating on the substrate after the solvent has been evaporated.

14. A tape element according to claim 10 wherein the synthetic non-crystalline amide wax comprises 45 to 55% of the non-tacky coating on the substrate after the solvent has been evaporated.

15. A process for producing pressure-activated elements for removing types or printed errors or the like comprising the steps of producing a composition consisting essentially of:
- a resin; and
- between 14 to 26% by weight of an amide wax material; and
- between 42 and 78% by weight of a volatile solvent vehicle consisting of an alcohol, toluene, or mixture thereof; and
- subsequently applying said composition to a flexible, pressure-deformable foundation, and then evaporating said vehicle to form an adhesive layer on the foundation in which said adhesive layer is substantially homogeneous and of uniform thickness and provides a continuous stratum which is substantially non-tacky.

* * * * *